United States Patent
Wolf et al.

(10) Patent No.: US 11,874,835 B2
(45) Date of Patent: Jan. 16, 2024

(54) SCHEDULING OF QUERY PIPELINE EXECUTION

(71) Applicant: SAP SE, Walldorf (DE)

(72) Inventors: Florian Wolf, Heidelberg (DE); Lukas Landgraf, Dresden (DE); Alexander Boehm, Schwetzingen (DE)

(73) Assignee: SAP SE, Walldorf (DE)

( * ) Notice: Subject to any disclaimer, the term of this patent is extended or adjusted under 35 U.S.C. 154(b) by 52 days.

(21) Appl. No.: 17/674,313

(22) Filed: Feb. 17, 2022

(65) Prior Publication Data

US 2023/0141462 A1 May 11, 2023

Related U.S. Application Data

(60) Provisional application No. 63/263,703, filed on Nov. 8, 2021.

(51) Int. Cl.
G06F 16/2453 (2019.01)
G06F 16/22 (2019.01)
G06F 11/34 (2006.01)

(52) U.S. Cl.
CPC .... *G06F 16/24544* (2019.01); *G06F 11/3409* (2013.01); *G06F 16/2255* (2019.01); *G06F 16/24539* (2019.01)

(58) Field of Classification Search
CPC .......... G06F 16/24544; G06F 11/3409; G06F 16/2255; G06F 16/24539; G06F 16/24528; G06F 16/24542
See application file for complete search history.

(56) References Cited

U.S. PATENT DOCUMENTS

| | | | |
|---|---|---|---|
| 6,920,454 B1* | 7/2005 | Chan | G06F 9/5061 |
| 7,574,425 B2 | 8/2009 | Chowdhuri | |
| 10,521,430 B1* | 12/2019 | Schreier | G06F 16/24557 |
| 2006/0080285 A1* | 4/2006 | Chowdhuri | G06F 16/24532 |
| 2010/0124233 A1* | 5/2010 | Shi | H04L 45/42 |
| | | | 370/401 |
| 2012/0173845 A1* | 7/2012 | Venkataramani | H04L 67/568 |
| | | | 711/216 |
| 2018/0150514 A1 | 5/2018 | Willems et al. | |

(Continued)

OTHER PUBLICATIONS

Communication: "Extended European Search Report", Feb. 28, 2023 (Feb. 28, 2023), European Patent Office, for European Application No. 22203587.5-1203, 8 pages.

(Continued)

*Primary Examiner* — Mark D Featherstone
*Assistant Examiner* — Kweku William Halm
(74) *Attorney, Agent, or Firm* — Buckley, Maschoff & Talwalkar LLC

(57) ABSTRACT

A system includes reception of a query execution plan associated with a plurality of query execution pipelines, estimated execution costs and estimated intermediate result cardinalities, determination of one or more precedence relationships of the plurality of query execution pipelines, determination of an execution order of the plurality of query execution pipelines based on the estimated execution costs, the estimated intermediate result cardinalities, and the one or more precedence relationships, and providing of the execution order of the plurality of query execution pipelines and the query execution plan to a query execution engine.

20 Claims, 11 Drawing Sheets

(56) References Cited

U.S. PATENT DOCUMENTS

2020/0364223 A1* 11/2020 Pal ................... G06F 16/24539
2021/0374602 A1* 12/2021 Zhang ................... G06N 5/022
2022/0121382 A1*  4/2022 Meiri ..................... G06F 3/061

OTHER PUBLICATIONS

Jindal, Alekh et al., "Microlearner: A fine-grained Learning Optimizer for Big Data Workloads at Microsoft", 2021 IEEE 37th International Conference on Data Engineering (ICDE), Apr. 19, 2021 (Apr. 19, 2021), ISBN: 978-1-7281-9184-3, XP033930358, DOI: 10.1109/ICDE51399.2021.00275, (pp. 2423-2434, 12 total pages).

Li, Quanzhong et al., "Adaptively Reordering Joins during Query Execution", Data Engineering, 2007 IEEE 23rd International Conference on, Apr. 1, 2007 (Apr. 1, 2007), XP031095746, ISBN: 978-1-4244-0802-3, (pp. 26-35, 10 total pages).

* cited by examiner

US 11,874,835 B2

SCHEDULING OF QUERY PIPELINE EXECUTION

CROSS-REFERENCE TO RELATED APPLICATIONS

The present application claims priority to U.S. Provisional Application No. 63/263,703, filed Nov. 8, 2021, the contents of which are incorporated herein by reference for all purposes.

BACKGROUND

In a conventional database system, a query optimizer receives a database query and generates a query execution plan based thereon. More specifically, the query optimizer determines a number of candidate execution plans based on a received query, estimates the cost of each execution plan and selects the plan with the lowest execution cost. An execution engine executes the selected query execution plan on the database and returns a corresponding result set.

A query execution plan may conform to a pipeline-based query execution model. According to such a model, a query execution plan consists of multiple execution pipelines. An execution pipeline takes a base table or result set of a previously-executed execution pipeline as input and performs a mix of unary operators or probes (e.g., hash joins) into the base table/result set in order to build another result set. Accordingly, execution pipelines are interdependent in that execution of a given execution pipeline may require the prior execution of one or more other execution pipelines.

The optimization of memory consumption during query processing is important due to increasing data sizes, query workloads and query complexity, particularly in cloud scenarios. For example, modern cloud-based systems are confronted with large numbers of complex Online Analytical Processing (OLAP) queries referencing numerous tables. Those queries are typically executed using execution pipelines as described above. Moreover, optimal usage of existing hardware resources in main-memory database systems may result in lower operational cost as well as higher throughput.

Systems to reduce memory consumption during query processing are desired, particularly in the case of pipeline-based query execution plans.

DETAILED DESCRIPTION

The following description is provided to enable any person in the art to make and use the described embodiments and sets forth the best mode contemplated for carrying out some embodiments. Various modifications, however, will be readily apparent to those in the art.

As noted above, a query execution plan output by a query optimizer may include several execution pipelines. The pipelines may be executed in various orders while still conforming to the query execution plan, where each execution order generates a same result set and is associated with a same execution cost. The present inventors have discovered that different pipeline execution orders may consume memory differently (i.e., exhibit different memory consumption profiles). Accordingly, with the goal of reducing memory consumption, it may be desirable to execute the execution pipelines of a query execution plan in a particular execution order which conforms to the query execution plan rather than in another execution order which also conforms to the query execution plan.

The present inventors have also discovered systems and methods to select a pipeline execution order from several pipeline execution orders which conform to a given query execution plan based on their relative memory consumption profiles. The systems and methods may be efficiently integrated into a database management system for performance after query optimization and before plan execution. In this regard, some embodiments utilize various data structures output by a query optimizer which include query execution plans as well as various estimated costs and cardinalities.

Figure 1:
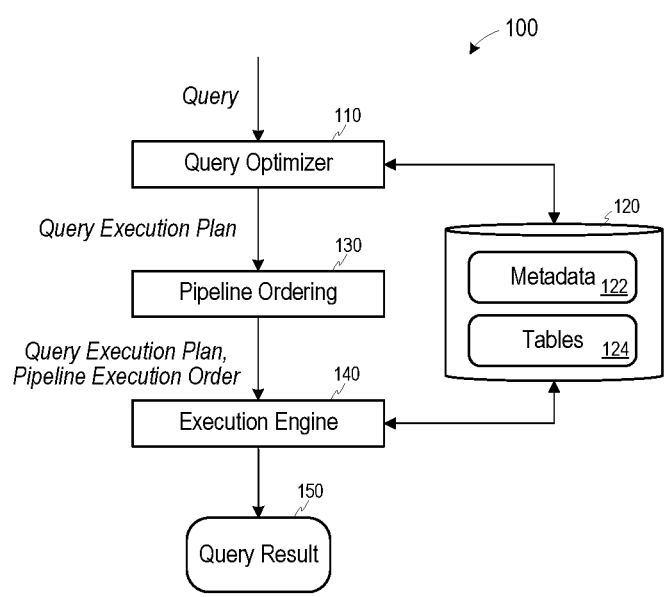
FIG. 1 is a block diagram of a system to determine a pipeline execution order for a query execution plan according to some embodiments.

FIG. 1 is a block diagram of system 100 according to some embodiments. Each illustrated element of system 100 may be implemented using any suitable combination of computing hardware and/or software that is or becomes known. System 100 may comprise components of a stand-alone or distributed (i.e., multi-node) database system. In some embodiments, two or more elements of system 100 are implemented by a single computing device. One or more elements of system 100 may be implemented as a cloud service (e.g., Software-as-a-Service, Platform-as-a-Service).

Query optimizer 110 receives a query from a client and determines a query execution plan for executing the query on tables 124 of database storage 120. Embodiments are not limited to any particular client or to any particular query language. Query optimizer 110 may therefore comprise any suitable query processor that is or becomes known. As is known in the art, query optimizer 110 may generate several alternative query execution plans and compute respective execution costs based on metadata 122 of database storage 120. Metadata 122 may define the structure and relationships of tables 124 (e.g., a database schema) as well as statistics which represent the data of tables 124. These statistics may be periodically refreshed by a statistics server (not shown) of system 100.

Query optimizer 110 selects one of the query execution plans and provides the selected query execution plan to pipeline ordering component 130. The query execution plan specifies execution pipelines, pipeline breakers, cardinality estimates of input tables and intermediate results, and execution costs for sub-trees of the query execution plan. The query execution plan may also include other data in some embodiments.

Figure 2:
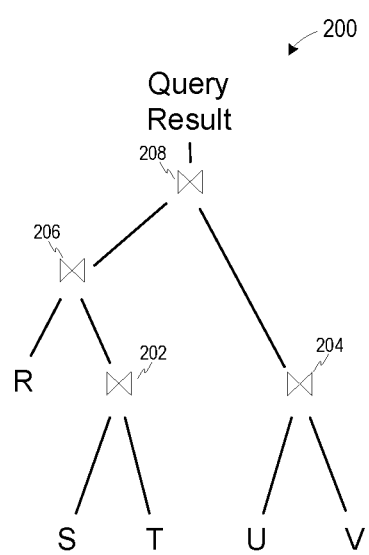
FIG. 2 is a diagram illustrating a query execution plan according to some embodiments.

FIG. 2 illustrates representation 200 of elements of a query execution plan received from a query optimizer according to some embodiments. The query execution plan includes input tables R, S, T, U and V and physical operators 202-208, represented as hash joins. Embodiments are not limited to hash joins.

Each hash join includes a build side and a probe side, as defined by the query execution plan. According to representation 200, the build side is the right side of a hash join, while the probe side is depicted on the left side of a hash join. The hash join is defined herein as a pipeline breaker of the build side and therefore terminates the pipeline which enters the right side of the hash join. For example, hash join 202 is a pipeline breaker of the pipeline beginning with table T, hash join 204 is a pipeline breaker of the pipeline beginning with table V, hash join 206 is a pipeline breaker of the pipeline beginning with table S, and hash join 208 is a pipeline breaker of the pipeline beginning with table U.

An execution pipeline may therefore depend on intermediate results generated by the pipeline breakers of other execution pipelines. For example, the intermediate results generated by hash joins 202 and 204 must remain in memory until they are consumed by hash join 208. Once a pipeline has produced a new intermediate result (or the final result), all intermediate results referenced thereby, e.g., hash tables against which the current pipeline has probed, can be released from memory.

Overall memory utilization during execution of a query execution plan varies over time since intermediate results have different sizes (e.g., number of records*record width) and the number of intermediate results maintained in memory changes during execution. The present inventors have noted that the order of execution of individual pipelines, which dictates the order and time over which intermediate results are generated, stored, and consumed by subsequently-executed pipelines, may significantly impact memory utilization.

Accordingly, pipeline ordering component 130 determines an order of execution of individual pipelines (i.e., pipeline execution order) which results in a most-desirable memory utilization. According to some embodiments, pipeline ordering component 130 determines all possible pipeline execution orders which conform to the query execution plan provided by query optimizer 110. Using the data provided with the query execution plan, and for each pipeline execution order, ordering component 130 estimates the memory usage over time, or memory profile, based on the memory sizes and the lifetimes of intermediate results generated by the pipeline breakers during execution according to the execution order. The pipeline execution order associated with the least-consumptive memory profile may then be selected as the pipeline execution order for executing the query execution plan.

Pipeline ordering component 130 then provides the query execution plan and the selected pipeline execution order to execution engine 140. Execution engine 140 executes the query execution plan as is known in the art, and according to the selected pipeline execution order, in order to generate result set 150 based on the data of tables 124.

Figure 3:
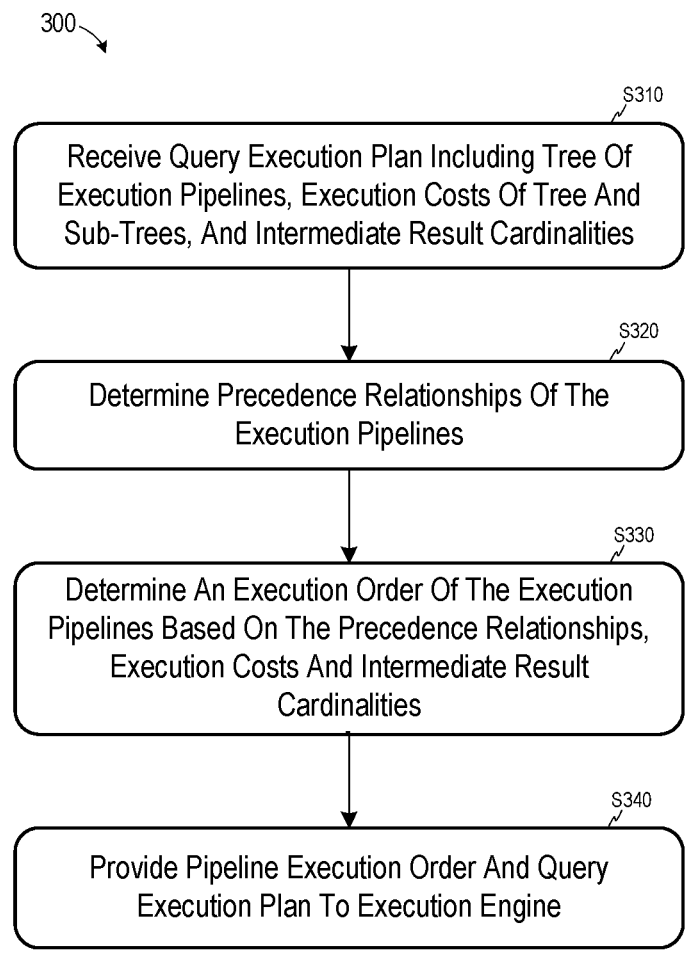
FIG. 3 comprises a flow diagram to determine a pipeline execution order for a query execution plan according to some embodiments.

FIG. 3 comprises a flow diagram of process 300 according to some embodiments. In some embodiments, various hardware elements of system 100 execute program code to perform process 300. Process 300 and all other processes mentioned herein may be embodied in processor-executable program code read from one or more of non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

A query is received and a query execution plan is generated based thereon prior to process 300. The query may be received from any client application by any form of query processor. According to some embodiments, the query is received by a query optimizer of a Structured Query Language (SQL) server. The query may therefore comprise an SQL query, but embodiments are not limited thereto.

A query optimizer such as query optimizer 110 generates a query execution plan based on the received query as is known in the art. Generation of a query execution plan may comprise estimation of execution costs associated with the query execution plan. The costs may be estimated based on the database tables to be queried and metadata describing the structure and content of the tables.

The query execution plan is received at S310 of process 300. The query execution plan includes a tree of execution pipelines, execution costs of the tree and sub-trees of the tree, and estimated cardinalities of intermediate results generated by pipeline breakers of the execution pipelines. The query execution plan may be received by pipeline ordering component 130 of system 100 but embodiments are not limited thereto. For example, the functions attributed herein to pipeline ordering component 130 may be performed in whole or in part by query optimizer 110.

The term "tree" is used herein to indicate that the execution pipelines can be seen as branching outward and downward via various pipeline breakers from the pipeline breaker which generates the final query result, as illustrated by representation 200. The query execution plan describes the inputs to each pipeline breaker, and identifies which input consists of the build side and which input consists of the probe side. The pipeline breakers, their inputs, and the build/probe side information of the query execution plan is sufficient to generate a representation of a query execution plan as shown in FIG. 2.

Figure 4:
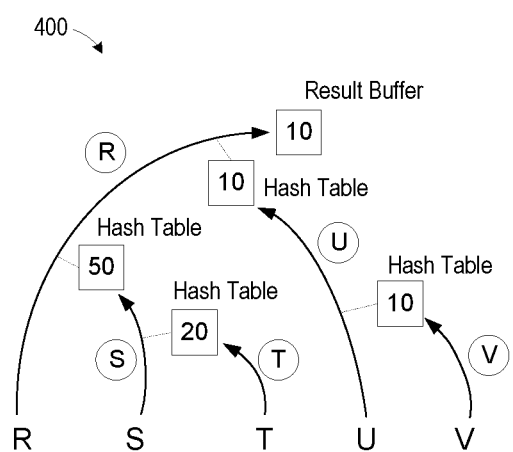
FIG. 4 is a pipeline-specific view of a query execution plan according to some embodiments.

FIG. 4 is a pipeline-specific view of the query execution plan shown in FIG. 2. Each pipeline is labeled by a circled letter which, in the case of FIG. 4, corresponds to the name of the input table of the pipeline. View 400 specifies the estimated cardinality (i.e., number of records) of intermediate results generated by each pipeline breaker.

As defined herein, each pipeline breaker terminates its build-side pipeline. For example, pipeline T terminates with a hash join with probe-side pipeline S, resulting in a hash table including an estimated 20 records. Pipeline S terminates with a hash join with probe-side pipeline R, resulting in a hash table including an estimated 50 records.

Returning to process 300, precedence relationships of the execution pipelines are determined at S320. The precedence relationships define which pipelines must be execution before which other pipelines according to the query execution plan. The precedence relationships may be derived from the tree of the query execution plan. With reference to FIG. 4, pipeline T must be executed before pipeline S and pipeline S must be executed before pipeline R. Similarly, pipeline V must be executed before pipeline U and pipeline U must be executed before pipeline R. However, no precedence relationship exists between pipelines U, V and pipelines S, T. The precedence relationships may be directly provided by the query optimizer along with the query execution plan according to some embodiments.

Next, at S330, an execution order of the execution pipelines is determined. The pipeline execution order is determined based on the precedence relationships, execution costs and intermediate result cardinalities. For example, all possible pipeline execution orders which conform to the query execution plan are initially determined. In the present example, the possible pipeline execution orders are (V,U,T,S,R), (V,T,S,U,R), (V,T,U,S,R), (T,S,V,U,R), (T,V,S,U,R) and (T,V,U,S,R).

An indicator of memory usage is determined for each pipeline execution order based on the execution costs and intermediate result cardinalities received at S310. This determination may include determination of the memory sizes and the lifetimes of intermediate results generated by the pipeline breakers during execution according to each execution order. A pipeline execution order is the determined based on the indicators. For example, the determined pipeline execution order may be the one associated with the most-favorable memory usage. Further details of S330 according to some embodiments will be described below.

The query execution plan and the determined pipeline execution order are provided to an execution engine at S340. The execution engine may then execute the query execution plan according to the pipeline execution order to generate a result set as is known in the art. The memory usage of such execution is presumed to be more desirable than that which would have resulted from execution of the query execution plan according to a different (e.g., randomly-selected) pipeline execution order.

Figure 5:
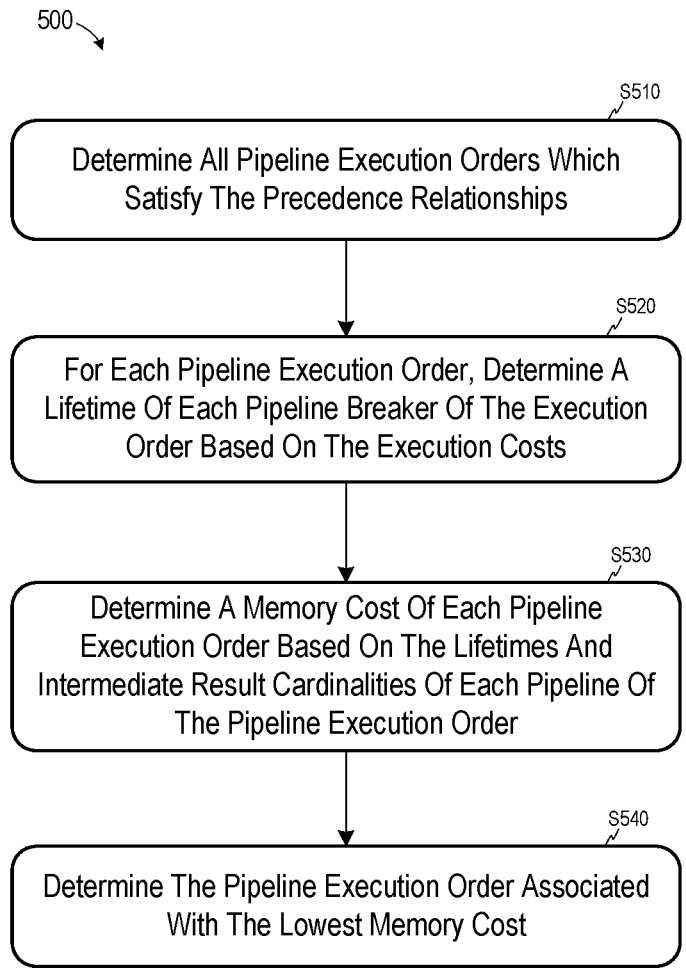
FIG. 5 comprises a flow diagram to determine a pipeline execution order for a query execution plan based on respective memory costs of candidate pipeline execution orders according to some embodiments.

FIG. 5 comprises a flow diagram to determine a pipeline execution order for a query execution plan based on respective memory costs of candidate pipeline execution orders according to some embodiments. Accordingly, process 500 may comprise an implementation of S330 of process 300.

Figure 6:
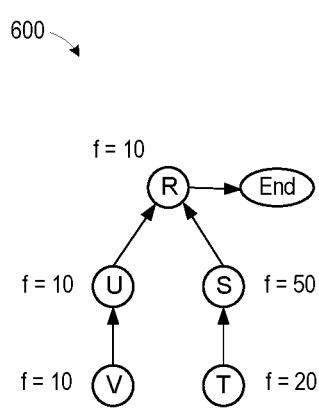
FIG. 6 is a graph illustrating precedence relationships and metadata associated with execution pipelines of a query execution plan according to some embodiments.

At S510, all pipeline execution orders which satisfy the precedence relationships of a query execution plan are determined. FIG. 6 is a graph illustrating the precedence relationships of the execution pipelines described above. As noted, the pipeline execution orders which satisfy the FIG. 6 graph are (V, U, T, S, R), (V, T, S, U, R), (V, T, U, S, R), (T, S, V, U, R), (T, V, S, U, R) and (T, V, U, S, R). Execution of the query execution plan according to one of these pipeline execution orders may result in creation and consumption of the intermediate results of the query execution plan at different time points than execution according to a different one of the pipeline execution orders, thereby resulting in different memory consumption profiles.

FIG. 6 also shows, for each pipeline, a cardinality f of its associated pipeline breaker. This value may be received from the query optimizer and/or determined based thereon. As described above, the query optimizer provides an estimated cardinality of each intermediate result of a query execution plan. Since each intermediate result corresponds to a pipeline breaker, the cardinality of a pipeline breaker is determined to be the cardinality of its corresponding intermediate result.

At S520, and for each of the pipeline execution orders determined at S510, a lifetime of each pipeline breaker is determined. The lifetime of a pipeline breaker may be determined based on the execution cost of its corresponding pipeline.

Figure 7:
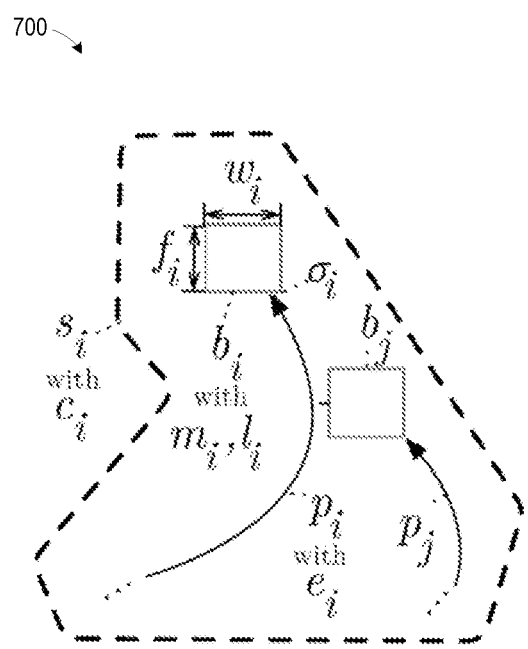
FIG. 7 is a generic view of a query execution plan sub-tree illustrating logical entities for the determination of pipeline memory costs according to some embodiments.

FIG. 7 illustrates logical entities referenced in the following discussion of execution costs, breaker lifetimes and memory sizes. According to some embodiments, a query execution plan includes sub-trees $s_i$, each with estimated execution cost $c_i$. The sub-trees and estimated execution costs are provided by a query optimizer as is known in the art. The intermediate result of a sub-tree $s_i$ exhibits cardinality $f_i$ and row (i.e., record) size $w_i$, and is written into corresponding pipeline breaker $b_i$, which marks the end of pipeline $p_i$.

In contrast to execution cost $c_i$ of entire sub-tree $s_i$, execution cost $e_i$ is the cost of executing pipeline $p_i$ only. Since estimated execution cost $c_i$ of sub-tree $s_i$ provided by the query optimizer does not include the cost of writing the result of sub-tree $s_i$ into pipeline breaker $b_i$, the cost of this writing is represented in FIG. 7 as execution cost $\sigma_i$. $l_i$ represents the lifetime of a pipeline breaker $b_i$.

According to some embodiments, the lifetime $l_i$ of a pipeline breaker $b_i$ is approximated at S520 by approximating the execution time of the corresponding pipeline $p_i$. In turn, the execution time of a pipeline $p_i$ can be approximated by the execution cost $e_i$ of the pipeline. The execution cost $e_i$ of pipeline $p_i$ may be derived by subtracting, from the estimated execution cost $c_i$ of the sub-tree $s_i$ corresponding to pipeline $p_i$, the estimated execution cost $c_j$ of all sub-trees $s_j$ of $s_i$, where $s_j$ includes only those sub-trees whose pipeline breaker $b_j$ is consumed by pipeline $p_i$. Pipeline execution time $\sigma_i$ is added to the resulting difference in order to account for the cost of writing the result of sub-tree $s_i$ and pipeline $p_i$ into pipeline breaker $b_i$. Accordingly, as shown below:

$$e_i = c_i - \sum_{p_j < p_i} c_j + \sigma_i$$

Some embodiments utilize the $C_{out}$ cost function, which is the sum of output cardinalities of all operators, including base table scans. Since the $C_{out}$ cost function does not distinguish the build cost and probe cost in the cost of a hash join, the cost $\sigma_i$ of writing into the pipeline breaker, e.g., the hash table, is set to 0, since $C_{out}$ already includes the cardinality of the result.

The lifetime of a pipeline breaker $b_i$ consists of the execution time $e_i$ of its respective pipeline $p_i$ plus the execution times of other pipelines which must be executed for the pipeline breaker $b_i$ to be consumed. For the example pipeline execution order (V, T, S, U, R) discussed above, the lifetime of the pipeline breaker of pipeline V is the sum of the execution times of the pipelines V, T, S, and U. Given a pipeline execution order $O=(p_1, \ldots, p_i, \ldots, p_j, \ldots, p_k, \ldots, p_n)$, the corresponding pipeline execution cost vector $\vec{e} = (e_1, \ldots, e_j, \ldots, e_n)$, and the precedence relationship $p_i < p_k$, the lifetime $l_i$ of the pipeline breaker $b_i$ of pipeline $p_i$ may be calculated as:

$$l_i = \sum_{j=i}^{k} e_j$$

Accordingly, the pipeline lifetime vector $\vec{l}$ for a pipeline execution order $O=(p_1, \ldots, p_i, \ldots, p_n)$ may be defined as as $\vec{l}=(l_1, \ldots, l_i, \ldots, l_n)$.

A memory cost of each pipeline execution order is determined at S530. The memory cost of a pipeline execution order may be determined based on the determined lifetimes and intermediate result cardinalities of each execution pipeline of the pipeline execution order. First the memory size $m_i$ of a pipeline breaker $b_i$ is approximated as the product of its corresponding cardinality $f_i$ and row size $w_i$ such that $m_i = w_i \cdot f_i$. With reference to the example of hash joins, this approximation is based on the assumption that pipeline breakers consist of densely-packed hash tables regardless of the hash table implementation. A vector of pipeline breaker memory sizes $\vec{m}$ for a given pipeline execution order $O = (p_0, \ldots, p_i, \ldots, p_n)$ is represented as $\vec{m}=(m_1, \ldots, m_i, \ldots, m_n)$.

According to some embodiments, the memory cost determined at S530 is a memory integral metric. The memory integral metric is computed by multiplying the vector of pipeline breaker memory costs $\vec{m}$ with the transposed vector of pipeline breaker lifetimes $\vec{l}$:

$$MI = \vec{m} \cdot \vec{l}^T$$

Therefore, the memory integral MI is the sum over all pipeline breakers $b_i$ of their memory size $m_i$ multiplied by their lifetime $l_i$. The memory consumption of a pipeline breakers is 0 before it is created, $m_i$ as soon as the respective pipeline starts operating until $b_i$ is destructed, and 0 afterwards.

At S540, the pipeline execution order with the lowest memory cost is determined. This determined pipeline execution order, along with the corresponding query execution plan, may then be provided to an execution engine for execution of the execution pipelines of the query execution plan in the determined pipeline execution order.

According to some embodiments, determination of all the pipeline execution orders which satisfy the precedence relationship at S510 ignore pipelines whose pipeline breakers are associated with a small memory cost. Such pipeline breakers are associated with short lifetimes, small memory sizes, or both. By ignoring such pipelines, the number of pipeline execution orders determined at S510 may be reduced significantly, resulting in overall faster execution of process 500.

For example, it is assumed that pipeline V is associated with a small memory cost and therefore selected to be ignored at S510. The pipeline execution orders which satisfy the dependencies of the FIG. 6 graph are therefore determined at S510 as (U, T, S, R), (T, S, U, R), and (T, U, S, R), which is half as many pipeline execution orders as determined in the above-described example of S510. Once the pipeline execution order of these three pipeline execution orders which is associated with the lowest memory cost is determined at S540, pipeline V is added to the determined pipeline execution order at a position within the order which conforms to the dependencies of the query execution plan.

Figure 8:
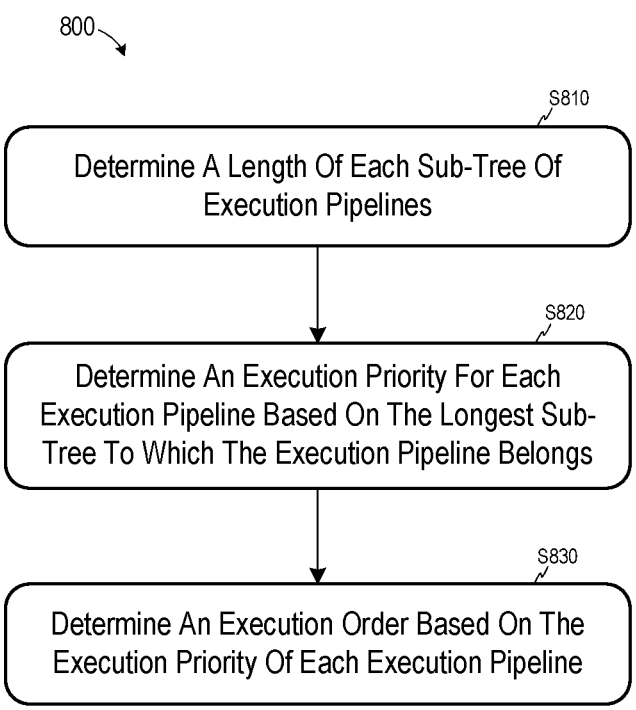
FIG. 8 comprises a flow diagram to determine a pipeline execution order for a query execution plan based on execution pipeline depth according to some embodiments.

FIG. 8 is a flow diagram of process 800 according to some embodiments. Process 800 may be executed to determine a pipeline execution order from a plurality of pipeline execution orders which conform to a given query execution plan. Some embodiments of process 800 do not utilize cardinalities of intermediate results or execution cots provide by a query optimizer to determine the pipeline execution order.

Rather, process 800 is a heuristic algorithm intended to determine a pipeline execution order having a low memory cost, but not necessarily the lowest memory cost of all the pipeline execution orders which conform to the subject query execution plan. In exchange for the sub-optimal selection of a pipeline execution order, process 800 may be executed much more quickly than process 500 of FIG. 5. The heuristic of process 800 is based on the observation that a deepest first execution of interdependent pipelines will yield a near-optimal pipeline execution orders. In other words, the execution of sub-trees in order of their length from the starting node to the result node is a "best guess" pipeline execution order.

Figure 9:
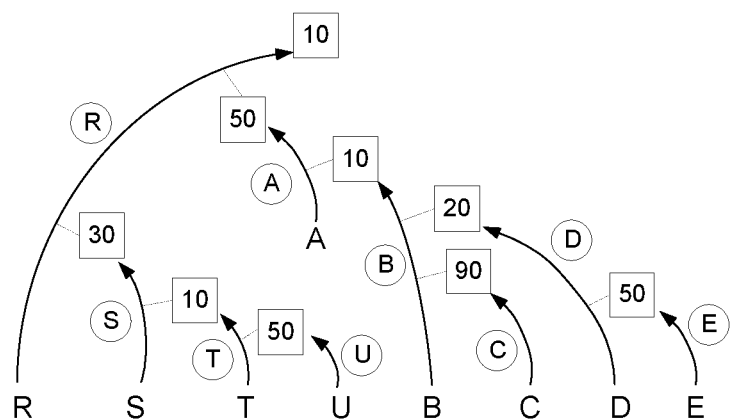
FIG. 9 is a pipeline-specific view of a query execution plan according to some embodiments.
Figure 10:
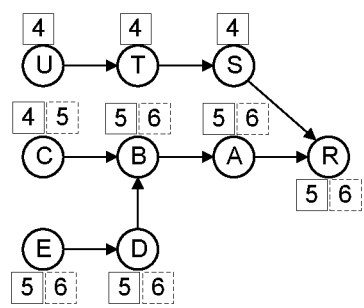
FIG. 10 is a graph illustrating precedence relationships and metadata associated with execution pipelines of a query execution plan according to some embodiments.

FIG. 9 is a pipeline-specific view of a query execution plan for purposes of describing some embodiments of process 800. The query execution plan of FIG. 9 includes nine base tables and eight intermediate hash tables. FIG. 10 represents the pipelines of the query execution plan as nodes in a dependency graph.

At S810 of process 800, a length of each sub-tree of execution pipelines is determined. With respect to the FIG. 10 example, the sub-trees and corresponding lengths determined at S810 are as follows: (E, D, B, A, R; 5); (C, B, A, R; 4); (U, T, S, R; 4).

Next, at S820, an execution priority is determined for each execution pipeline based on the longest sub-tree to which the execution pipeline belongs. Continuing the present example, execution pipelines E, D, B, A, R are assigned priority 5, execution pipeline C is assigned priority 4, and execution pipelines U, T and S are assigned priority 4. Since execution pipeline C is assigned priority 4 and execution pipelines U, T and S are also assigned priority 4, potential ordering conflicts may be addressed by incrementing the priority of either execution pipeline C or execution pipelines U, T and S, and similarly incrementing the priorities of all higher-priority pipelines. In the present example, and as indicated by the dashed boxes of FIG. 10, the priority of execution pipeline C is incremented from 4 to 5 due to its relation to higher-priority execution pipelines B, A and R. Accordingly, the priorities of higher-priority execution pipelines E, D, B, A and R are also incremented from 5 to 6.

A pipeline execution order is determined at S830 based on the assigned priorities. Determination of the pipeline execution order is primarily based on the dependencies of the query execution plan. However, as noted above, at certain points of execution two or more pipelines may be selected as a next pipeline to execute while still conforming to the dependencies. In some embodiments of S830, the selected next pipeline is the pipeline assigned the highest priority of the two or more pipelines.

Turning to the present example, any of execution pipelines E, C and U may be the first pipeline in the pipeline execution order. However, execution pipeline E is selected since it is assigned the highest priority of the three pipelines. The next execution pipeline, based on the dependency graph, may be D, C or U. Execution pipeline D is selected as the next execution pipeline since it is assigned the highest priority of the three pipelines. At this point of execution, only pipelines C or U can be executed (e.g., pipeline B cannot be executed because it requires the intermediate results generated by pipeline C). Pipeline C is selected for next execution due to its higher assigned priority. The logic continues as described above for the remaining execution pipelines, resulting in a determined pipeline execution order determined of (E, D, C, B, A, U, T, S, R).

According to some embodiments, process 800 is executed to determine a pipeline execution order relatively quickly, and a memory cost of this determined pipeline execution order is determined as described above. Next, process 500 is executed as described above (with or without the pipeline-ignoring alternative). However, if a sub-result determined at S530 during the determination of a memory cost of a particular pipeline execution order exceeds the memory cost of the pipeline execution order determined via process 800, determination of the memory cost of the particular pipeline execution order pipeline is aborted.

Figure 11:
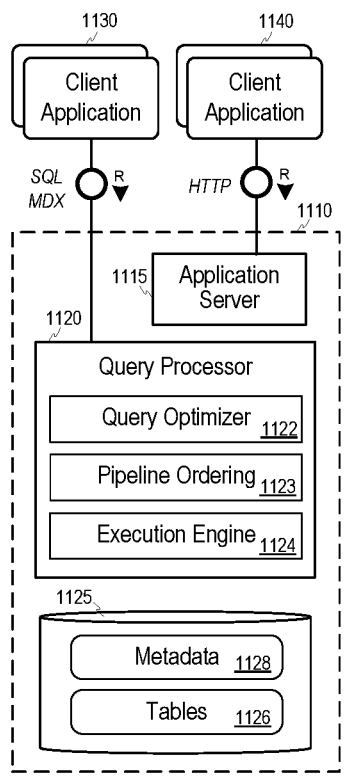
FIG. 11 is a block diagram of a database node according to some embodiments.

FIG. 11 is a block diagram of a database architecture which may determine pipeline execution orders for query execution plans according to some embodiments. Embodiments are not limited to the FIG. 11 architecture.

Server node 1110 may receive a query from one of client applications 1130 and 1140 and return results thereto based on data stored within server node 1110. Node 1110 executes program code to provide application server 1115 and query processor 1120. Application server 1115 provides services for executing server applications. For example, Web applications executing on application server 1115 may receive Hypertext Transfer Protocol (HTTP) requests from client applications 1140 as shown in FIG. 11.

Query processor 1120 may include stored data and engines for processing the data. Query processor 1120 may also be responsible for processing Structured Query Language (SQL) and Multi-Dimensional eXpression (MDX) statements and may receive such statements directly from client applications 1130.

Query processor 1120 includes query optimizer 1122 for use in determining query execution plans, pipeline ordering component 1123 for determining pipeline execution orders for query execution plans as described herein, and execution engine 1124 for executing query execution plans against tables 1126 of storage 1125 using the determined pipeline execution orders. Query processor 1120 may also include a statistics server (not shown) in some embodiments for determining statistics used to estimate query execution plan costs.

In some embodiments, the data of storage 1125 may comprise one or more of conventional tabular data, row-stored data, column-stored data, and object-based data. Moreover, the data may be indexed and/or selectively replicated in an index to allow fast searching and retrieval thereof. Server node 1110 may support multi-tenancy to separately support multiple unrelated clients by providing multiple logical database systems which are programmatically isolated from one another.

Metadata 1128 includes data describing a database schema to which tables 1126 confirm. Metadata 1128 may therefore describe the columns and properties of tables 1126, the properties of each column of each table 1126, the interrelations between the columns, and any other suitable information. In one example, metadata 1128 may identify one or more columns of tables 1126 as dictionary-compressed and include information for locating the column dictionary and dictionary indices associated with each dictionary-compressed column.

Server node 1110 may implement storage 1125 as an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 12:
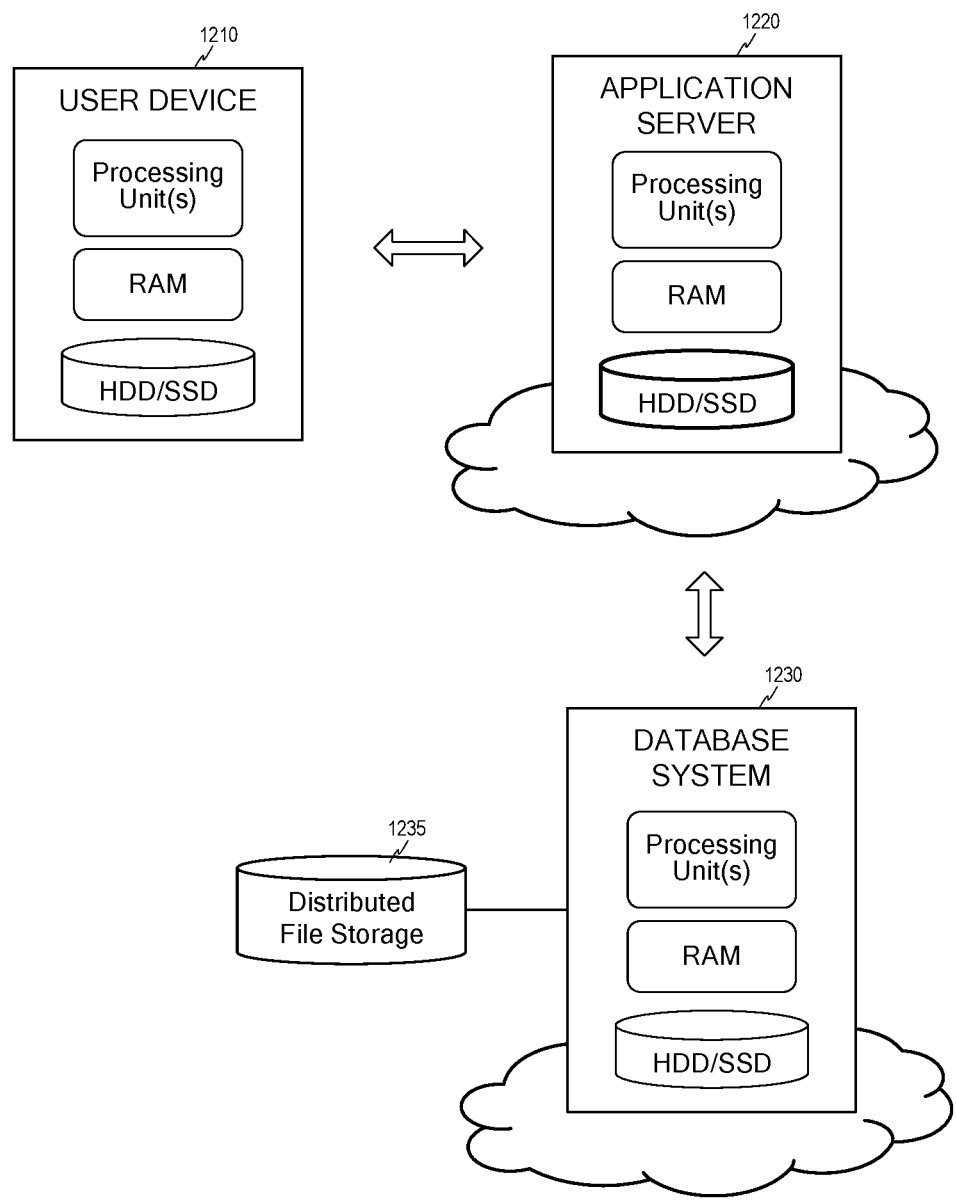
FIG. 12 is a view of a cloud-based architecture according to some embodiments.

FIG. 12 illustrates a cloud-based database deployment according to some embodiments. The illustrated components may reside in one or more public clouds providing self-service and immediate provisioning, autoscaling, security, compliance and identity management features.

User device 1210 may interact with applications executing on application server 1220, for example via a Web Browser executing on user device 1210, in order to create, read, update and delete data managed by database system 1230 and persisted in distributed file storage 1235. Database system 1230 may store data and may execute processes as described herein to determine pipeline execution orders for executing query execution plans on the data. Application server 1220 and/or database system 1230 may comprise cloud-based compute resources, such as virtual machines, allocated by a public cloud provider. As such, application server 1220 and database system 1230 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code in order to cause the system to:
receive a query execution plan associated with a plurality of query execution pipelines, estimated execution costs and estimated intermediate result cardinalities;
determine one or more precedence relationships of the plurality of query execution pipelines;
determine a plurality of execution orders of the plurality of query execution pipelines based on the one or more precedence relationships;
for each of the plurality of execution orders, determine a memory size and lifetime of intermediate results of each pipeline based on the estimated execution costs and the estimated intermediate result cardinalities;
determine an execution order from the plurality of query execution orders based on the memory size and lifetime of intermediate results of each pipeline determined for each of the plurality of execution orders; and
provide the execution order of the plurality of query execution pipelines and the query execution plan to a query execution engine.

2. A system according to claim 1, wherein determination of the execution order comprises:
determination of a memory cost of each of the plurality of execution orders based on the memory size and lifetime of intermediate results of each pipeline determined for each of the plurality of execution orders; and
determination of the execution order from the plurality of execution orders based on the memory costs determined for each of the plurality of execution orders.

3. A system according to claim 2, wherein determination of the execution order from the plurality of execution orders comprises determination of one of the plurality of execution orders having a lowest memory cost.

4. A system according to claim 2, wherein determination of the plurality of execution orders of the plurality of query execution pipelines based on the one or more precedence relationships comprises:
determination of one of the plurality of query execution pipelines having a memory cost below a threshold,
wherein the determined plurality of execution orders do not include the one of the plurality of query execution pipelines having a memory cost below a threshold.

5. A system according to claim 1, wherein determination of the execution order comprises:
determination of a longest pipeline path to which each of the plurality of query execution pipelines belongs, and based on the one or more precedence relationships; and
determination of the execution order based on the longest pipeline path to which each of the plurality of query execution pipelines belongs.

6. A system according to claim 5, wherein determination of the execution order comprises:
determination of a first execution order based on the longest pipeline path to which each of the plurality of query execution pipelines belongs;
determination of a plurality of execution orders of the plurality of query execution pipelines based on the one or more precedence relationships;
determination of a memory cost of the first execution order based on the memory size and lifetime of intermediate results of each pipeline determined for the first execution order;
determination of a memory cost of each of the plurality of execution orders based on the memory size and lifetime of intermediate results of each pipeline determined for each of the plurality of execution orders, wherein determination of a memory cost of one of the plurality of execution orders terminates if the memory cost of the one of the plurality of execution orders will exceed the memory cost of the first execution order; and
determination of the execution order from the plurality of execution orders based on the memory cost determined for each of the plurality of execution orders.

7. A system according to claim 6, wherein determination of the plurality of execution orders of the plurality of query execution pipelines based on the one or more precedence relationships comprises:
determination of one of the plurality of query execution pipelines having a memory cost below a threshold,
wherein the determined plurality of execution orders do not include the one of the plurality of query execution pipelines having a memory cost below a threshold.

8. A computer-implemented method comprising:
receiving a query execution plan associated with a plurality of query execution pipelines, estimated execution costs and estimated intermediate result cardinalities;
determining one or more precedence relationships of the plurality of query execution pipelines;
determining a plurality of execution orders of the plurality of query execution pipelines based on the one or more precedence relationships;
for each of the plurality of execution orders, determining a memory size and lifetime of intermediate results of each pipeline based on the estimated execution costs and the estimated intermediate result cardinalities;
determining an execution order from the plurality of query execution orders based on the memory size and lifetime of intermediate results of each pipeline determined for each of the plurality of execution order; and
providing the execution order of the plurality of query execution pipelines and the query execution plan to a query execution engine.

9. A method according to claim 8, wherein determining the execution order comprises:
determining a memory cost of each of the plurality of execution orders based on the memory size and lifetime of intermediate results of each pipeline determined for each of the plurality of execution orders; and
determining the execution order from the plurality of execution orders based on the memory cost determined for each of the plurality of execution orders.

10. A method according to claim 9, wherein determining the execution order from the plurality of execution orders comprises determining one of the plurality of execution orders having a lowest memory cost.

11. A method according to claim 9, wherein determining the plurality of execution orders of the plurality of query execution pipelines based on the one or more precedence relationships comprises:
determining one of the plurality of query execution pipelines having a memory cost below a threshold,
wherein the determined plurality of execution orders do not include the one of the plurality of query execution pipelines having a memory cost below a threshold.

12. A method according to claim 8, wherein determining the execution order comprises:
determining a longest pipeline path to which each of the plurality of query execution pipelines belongs, based on the one or more precedence relationships; and determining the execution order based on the longest pipeline path to which each of the plurality of query execution pipelines belongs.

13. A method according to claim 12, wherein determining the execution order comprises:
determining a first execution order based on the longest pipeline path to which each of the plurality of query execution pipelines belongs;
determining a plurality of execution orders of the plurality of query execution pipelines based on the one or more precedence relationships;
determining a memory cost of the first execution order based on the memory size and lifetime of intermediate results of each pipeline determined for the first execution order;
determining a memory cost of each of the plurality of execution orders based on the memory size and lifetime of intermediate results of each pipeline determined for each of the plurality of execution orders, wherein determination of a memory cost of one of the plurality of execution orders terminates if the memory cost of the one of the plurality of execution orders will exceed the memory cost of the first execution order; and
determining the execution order from the plurality of execution orders based on the memory cost determined for each of the plurality of execution orders.

14. A method according to claim 13, wherein determining the plurality of execution orders of the plurality of query execution pipelines based on the one or more precedence relationships comprises:
determining one of the plurality of query execution pipelines having a memory cost below a threshold,
wherein the determined plurality of execution orders do not include the one of the plurality of query execution pipelines having a memory cost below a threshold.

15. A non-transitory medium storing processor-executable program code, the program code executable by a computing system to cause the computing system to:
receive a query execution plan associated with a plurality of query execution pipelines, estimated execution costs and estimated intermediate result cardinalities;
determine one or more precedence relationships of the plurality of query execution pipelines;
determining a plurality of execution orders of the plurality of query execution pipelines based on the one or more precedence relationships;
for each of the plurality of execution orders, determining a memory size and lifetime of intermediate results of each pipeline based on the estimated execution costs and the estimated intermediate result cardinalities;
determine an execution order from the plurality of query execution orders based on the memory size and lifetime of intermediate results of each pipeline determined for each of the plurality of execution orders; and
provide the execution order of the plurality of query execution pipelines and the query execution plan to a query execution engine.

16. A medium according to claim 15, wherein determination of the execution order comprises:
determination of a memory cost of each of the plurality of execution orders based on the memory size and lifetime of intermediate results of each pipeline determined for each of the plurality of execution orders; and
determination of the execution order from the plurality of execution orders based on the memory cost determined for each of the plurality of execution orders.

17. A medium according to claim 15, wherein determination of the plurality of execution orders of the plurality of query execution pipelines based on the one or more precedence relationships comprises:
determination of one of the plurality of query execution pipelines having a memory cost below a threshold,
wherein the determined plurality of execution orders do not include the one of the plurality of query execution pipelines having a memory cost below a threshold.

18. A medium according to claim 15, wherein determination of the execution order comprises:
determination of a longest pipeline path to which each of the plurality of query execution pipelines belongs, based on the one or more precedence relationships; and
determination of the execution order based on the longest pipeline path to which each of the plurality of query execution pipelines belongs.

19. A medium according to claim 18, wherein determination of the execution order comprises:
determination of a first execution order based on the longest pipeline path to which each of the plurality of query execution pipelines belongs;
determination of a plurality of execution orders of the plurality of query execution pipelines based on the one or more precedence relationships;
determination of a memory cost of the first execution order based on the memory size and lifetime of intermediate results of each pipeline determined for the first execution order;
determination of a memory cost of each of the plurality of execution orders based on the memory size and lifetime of intermediate results of each pipeline determined for each of the plurality of execution orders, wherein determination of a memory cost of one of the plurality of execution orders terminates if the memory cost of the one of the plurality of execution orders will exceed the memory cost of the first execution order; and
determination of the execution order from the plurality of execution orders based on the memory cost determined for each of the plurality of execution orders.

20. A medium according to claim 18, wherein determination of the plurality of execution orders of the plurality of query execution pipelines based on the one or more precedence relationships comprises:
determination of one of the plurality of query execution pipelines having a memory cost below a threshold,
wherein the determined plurality of execution orders do not include the one of the plurality of query execution pipelines having a memory cost below a threshold.

* * * * *